Inventor
E. OKAMOTO-
Y. SEKI-
S. SUZUKI
By
Attorney

United States Patent Office 3,065,393
Patented Nov. 20, 1962

3,065,393
CAPACITOR
Eiichi Okamoto, Yasuo Seki, and Seizo Suzuki, all of Tokyo, Japan, assignors to Nippon Electric Company Limited, Tokyo, Japan, a corporation of Japan
Filed Nov. 4, 1959, Ser. No. 850,932
Claims priority, application Japan Dec. 9, 1958
5 Claims. (Cl. 317—258)

This invention relates to electric capacitors.

A principal object of the invention is to provide an improved capacitor of the so-called dry type employing an oxidizable metal sheet or foil and a superposed dielectric surface in the form of a composite semiconductor. A typical capacitor of the kind to which the invention relates is described in U.S. Patent No. 2,836,776.

Another principal object is to provide an improved arrangement for making electrical contact with an electrode of an electrostatic capacitor and the like.

A feature of the invention relates to an improved connection tab or sheet for electrostatic capacitors especially capacitors of the composite dielectric-semiconductor film kind, whereby the capacitor can be used at relatively high working temperatures, for example 200 degrees C. to 250 degrees C. without danger of deterioration of the lead-in contact.

Another feature relates to a lead-in conductor for electric devices such as capacitors, rectifiers and the like, comprising a composite thin sheet or tab comprised of a metallic coated mica with a sandwiched intervening resin film, the three layers constituting a unitary thin sheet or film having the desired low resistance contact surface with high mechanical strength against breakage, chipping or cracking of the mica.

A further feature relates to an electrostatic capacitor of the dry kind employing as one electrode an oxidizable metal foil such as tantalum, aluminum, zirconium, titanium, etc., which carries an integral anodic oxide film of the metal, and on which oxide film there is formed a semiconductor such as germanium, lead sulfide, cadmium sulphide or zinc oxide. There is also formed on the semiconductor a metallic coating which constitutes the cathode electrode. In conjunction with the cathode electrode there is provided a novel connection means which has in low electric resistance contact with the said metal film cathode, the connector being constituted of a thin film or unitary sheet formed of a stratum of heat resistant resin sandwiched between a mica stratum and a metallic stratum.

Other features and advantages will appear from the ensuing descriptions, the appended claims and the attached drawing.

Figure 1:
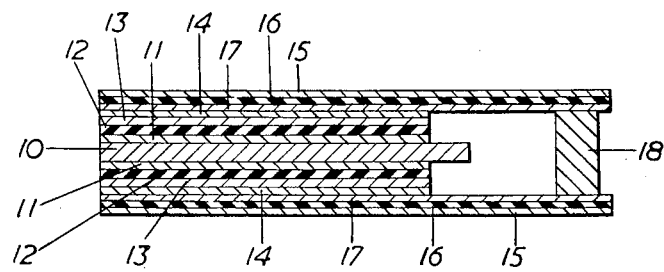
FIG. 1 is a highly magnified cross sectional view of a capacitor embodying dual contactor elements according to the invention.

While the invention finds its primary utility in connection with electrostatic condensers of the kind illustrated in U.S. Patent No. 2,836,776, it will be clear that in certain of its aspects the invention is equally well applicable to other similar devices. For explanatory purposes, therefore, the invention is illustrated in connection with a capacitor of the above mentioned type. For example as shown in FIG. 1 of the drawing, the capacitor may comprise a metal foil 10 of tantalum, aluminum, zirconium, titanium, etc., carrying on its opposite faces integrally attached anodic films 11 of the oxide of the metal 10. For example, the electrode 10 may be formed from a tantalum leaf 80 mm. long, 25 mm. wide, and 0.013 mm. thick. The anodic oxide film 11 may be formed in any well known manner, for example as described in U.S. Patent No. 2,836,776. As explained in said patent, it is believed that the stratum of film 11 next adjacent the metal 10 is N-type semiconductor, and the thickness of the oxide film 11 is a function of its formation voltage. The stratum of film 11 remote from metal 10 becomes an intrinsic semiconductor. Preferable, although not necessarily, the formation voltage for the oxide film 11 may be approximately 180 volts.

An insulating dielectric film 12, for example of magnesium fluoride is deposited on the oxide film 11 by any well known process, such for example as by vapor condensation. Then a semiconductor film 13, for example of germanium, is deposited by evaporation on to the film 12. Finally, a film 14 of aluminum is deposited, for example by vapor condensation, to the desired thickness on the film 12 and thus constitutes the cathode of the capacitor.

Figure 2:
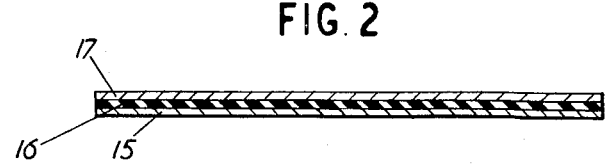
FIG. 2 is a magnified cross sectional view of one of the electrical contactors shown in FIG. 1.

In accordance with the invention, electrical circuit contact is made to the aluminum film 14 by a special form of contactor member, one of which is shown in magnified cross section in FIG. 2 of the drawing. This contactor comprises a thin mica sheet 15, for example of 0.01 mm. to 0.03 mm. thickness. One entire face of each mica sheet is coated in any well known manner with a film 16 of heat resistant resin, for example silicon resin. It will be understood, of course, that any other well known heat resistant resin may be employed. The resin film 16 may have a thickness of 0.01 mm. to 0.03 mm. and is baked on the mica 15 so as to be integrally bonded thereto. Then a conductive film 17, for example of aluminum, is coated on to the surface of the resin film 16 so as to be permanently bonded thereto. If the metal film 17 were coated directly on to the mica sheet 15, while the mica itself has sufficient heat resistance or stability, nevertheless because of the lack of mechanical strength in the mica, particularly if the mica is rolled or bent around a small radius, it tends to crack or chip, and would cause corresponding weaknesses in the metal film 17. However, by sandwiching the heat resistant resin film 16 between the mica 15 and metal coating 17 in the form of a coating which is permanently bonded both to the mica and to the metal film, the above noted difficulties are overcome.

In the particular capacitor shown in FIG. 1, dual cathodes are provided for the dual anodic films 11 on opposite surfaces of the tantalum foil 10. Accordingly the aluminum foils 14 of the dual cathodes are provided with similar connector members of the type shown in FIG. 1 and described above. After the capacitor constituted of the elements 12 to 14 has been made, each of the contactor members is assembled in pressed surface contact with the respective aluminum electrodes 14 and with the aluminum coatings 17 of the said contact members in contact with the said aluminum electrode 14, as shown in FIG. 1 of the drawing. The contactor members are of sufficient length to provide the necessary area of surface contact between the respective elements 14 and 17 and also the contactor members extend beyond the end or edge of the capacitor, and these extending ends are bridged by a metallic wire 18 which may be integrally united to the opposed aluminum coatings 17 on the two contactor members. The wire 18 can then be soldered or otherwise connected into any suitable circuit in which the capacitor is to be used. The tantalum electrode 10 at the opposite end of the capacitor can also be provided with a suitable wire (not shown) for connecting it into the associated circuit. In one particular example of the invention the anodic film 11 was formed on a tantalum leaf 10 approximately 80 mm. long and 25 mm. wide and 0.013 mm. thick, the formation being at 180 volts. The insulating film 12 was of magnesium fluoride, the semiconductor film 13 was of germanium, and the film 14 was of aluminum. The resin film 16 for the contactor members was constituted of silicon polymer 0.03 mm. thickness and was baked on the mica sheet 15 which was approximately 100 mm. in length, 27 mm. in width and 0.01 mm. in thickness, the said film being baked for two hours at a baking temperature of 250 degrees C. The aluminum coating 17 was condensed by evaporation on the polymer film 16 but the width of the said coating 17 was somewhat less than the width of the mica 15, for example a width of 23 mm.

The capacitor so described had a capacity of 1.1 $\mu$f., a loss factor (tan $\delta$) of 4 percent; a leakage current of 0.1 microampere per volt capacity; the working voltage of the condenser was approximately 50 volts and the working temperature was approximately 250 degrees C. However, the working voltage for temperatures beyond 150 degrees C. would be 35 volts. The capacitor was life tested at 30 volts and at 200 degrees C., and it was found that the electrical characteristics of the capacitor after 500 hours did not suffer any substantial change.

Various changes and modifications may be made in the disclosed embodiments without departing from the spirit and scope of the invention.

What is claimed is:

1. An electric capacitor having a pair of capacitor electrodes, and means to make electrical external contact with one of said electrodes, the last mentioned means including a unitary sheet of mica and a metallic coating with an intervening film of heat resistant resin which is integrally bonded to the mica and metallic coating, said metallic coating being in surface contact with said electrode.

2. An electric capacitor according to claim 1 in which said capacitor electrode is a metallic film and in which the heat resistant resin is a silicon resin polymer.

3. An electric capacitor of the kind having one electrode carrying an integral anodic oxide film and another electrode spaced therefrom and with an intervening semiconductor film, and means to make electric contact with at least one of said electrodes, the last mentioned means comprising a unitary sheet comprised of an integrally bonded mica layer and a metallic coating with an intervening heat resistant resin.

4. An electric capacitor according to claim 3 in which all said electrodes and said oxide film and said semiconductor film are integrally bonded as successive coatings to constitute a single unit, said unit having a pair of external capacitor electrodes, contactor means for each external electrode and being in the form of an integral unitary sheet comprised of three bonded sheet-like layers of mica, heat resistant resin and metallic film, each contactor member having the metallic film thereof in extended surface contact with a corresponding one of said external electrodes, and a wire connector bridged across the metallic films of both of said contactors.

5. An electric capacitor constituted of a series of integrally bonded alternate metallic and dielectric films and contactor means for one of said metallic films, said contactor means comprising a mica sheet having deposited and baked thereon a heat resistant resin film and a coating of metal deposited on said resin film, said coating of metal being in surface contact with one of said external electrodes.

References Cited in the file of this patent

UNITED STATES PATENTS

| | | |
|---|---|---|
| 2,223,833 | Sander | Dec. 3, 1940 |
| 2,593,829 | Arledter | Apr. 22, 1952 |
| 2,607,825 | Eisler | Aug. 19, 1952 |
| 2,806,985 | Lamphier | Sept. 17, 1957 |
| 2,836,776 | Ishikawa | May 27, 1958 |
| 2,890,396 | Hutzler | June 9, 1959 |